(12) United States Patent
Tajima

(10) Patent No.: US 7,034,902 B2
(45) Date of Patent: Apr. 25, 2006

(54) IMAGE DISPLAY SYSTEM, IMAGE DISPLAY APPARATUS AND PERIPHERAL DEVICES OF IMAGE DISPLAY APPARATUS

(75) Inventor: Hisao Tajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 531 days.

(21) Appl. No.: 09/941,592

(22) Filed: Aug. 30, 2001

(65) Prior Publication Data

US 2002/0027613 A1 Mar. 7, 2002

(30) Foreign Application Priority Data

Sep. 7, 2000 (JP) ............................. 2000-272181
Aug. 27, 2001 (JP) ............................. 2001-256642

(51) Int. Cl.
*H04N 5/64* (2006.01)

(52) U.S. Cl. ................. 348/836; 248/221.11; 248/918; 361/683; 361/681

(58) Field of Classification Search ................. 348/552, 348/14.04, 14.01, 373, 375, 836, 838, 839; 361/686, 681, 687, 683; 248/231.31, 187.1, 248/229.11, 918; 439/110–122, 17
See application file for complete search history.

(56) References Cited

U.S. PATENT DOCUMENTS

| | | | |
|---|---|---|---|
| 3,748,416 A * | 7/1973 | Wechter ................... 200/61.74 |
| 4,533,190 A * | 8/1985 | Booty ......................... 439/110 |
| 4,676,567 A * | 6/1987 | Mouchi ...................... 439/207 |
| 5,341,276 A * | 8/1994 | Shen .......................... 362/226 |
| 5,768,163 A * | 6/1998 | Smith, II .................... 708/105 |
| 5,769,374 A * | 6/1998 | Martin et al. .......... 248/221.11 |
| 5,790,193 A * | 8/1998 | Ohmori ...................... 348/375 |
| 5,831,817 A * | 11/1998 | Chang ........................ 361/681 |
| 6,081,422 A * | 6/2000 | Ganthier et al. ............ 361/686 |
| 6,239,841 B1 * | 5/2001 | Verstockt et al. ........... 348/373 |
| 6,416,239 B1 * | 7/2002 | Chou et al. ................. 396/419 |
| 6,481,681 B1 * | 11/2002 | Stunkel et al. ......... 248/231.31 |

* cited by examiner

*Primary Examiner*—Michael H. Lee
(74) *Attorney, Agent, or Firm*—Fitzpatrick, Cella, Harper & Scinto

(57) ABSTRACT

An image display system has an image display apparatus and a peripheral device that can be mounted on the image display apparatus. The image display apparatus includes a first electrode for electrically connecting the image display apparatus and peripheral device, and the peripheral device includes a second electrode for electrically connecting the image display apparatus and peripheral device. These electrodes are placed so as to have contact with one another when the peripheral device is mounted on the image display apparatus. In addition, the image display system moves the mounting position of the peripheral device on the image display apparatus as appropriate. The system minimizes cables used for electrical connections between the image display apparatus and peripheral devices, makes the apparatus compact and allows adoption of a variety of layouts.

10 Claims, 10 Drawing Sheets

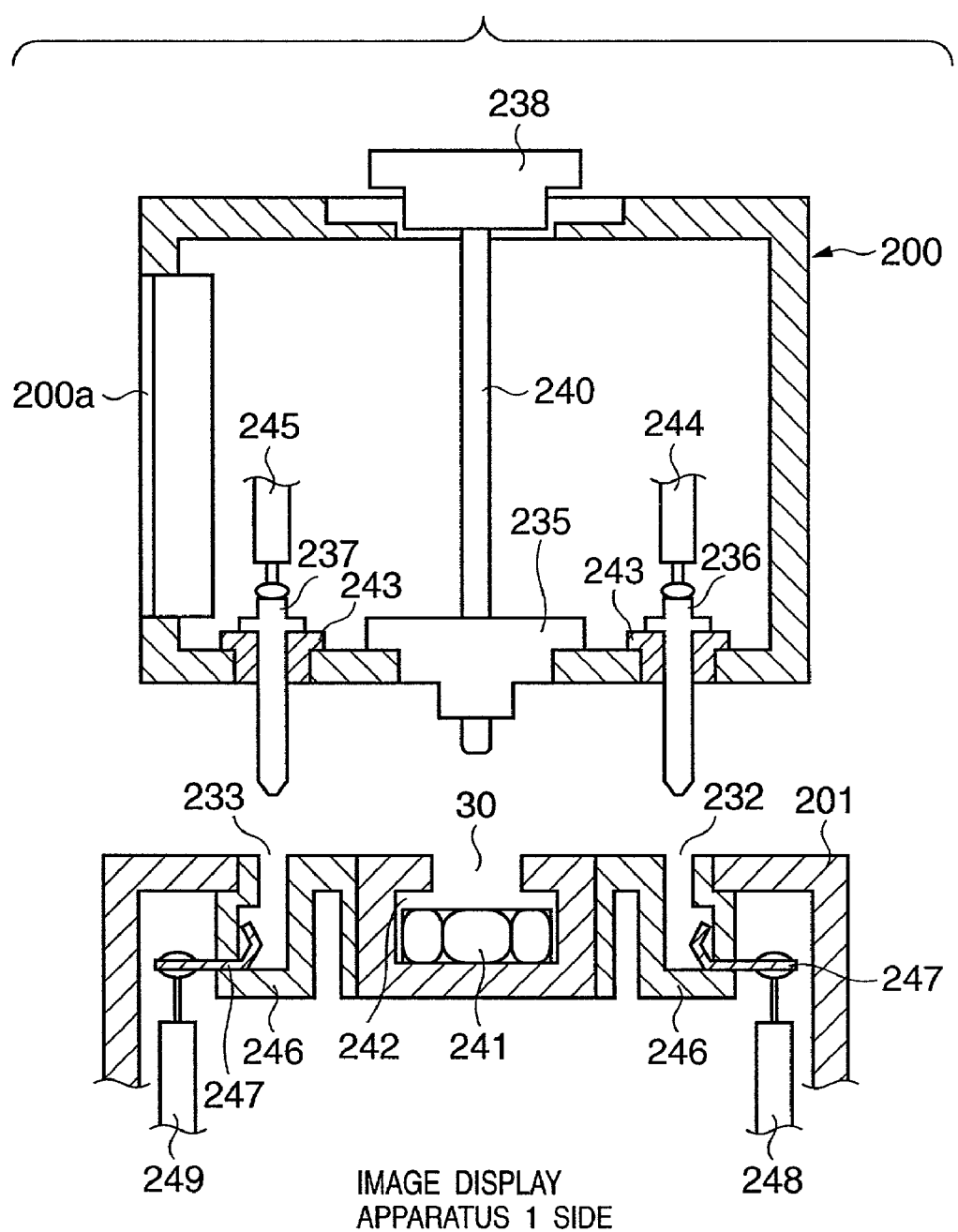

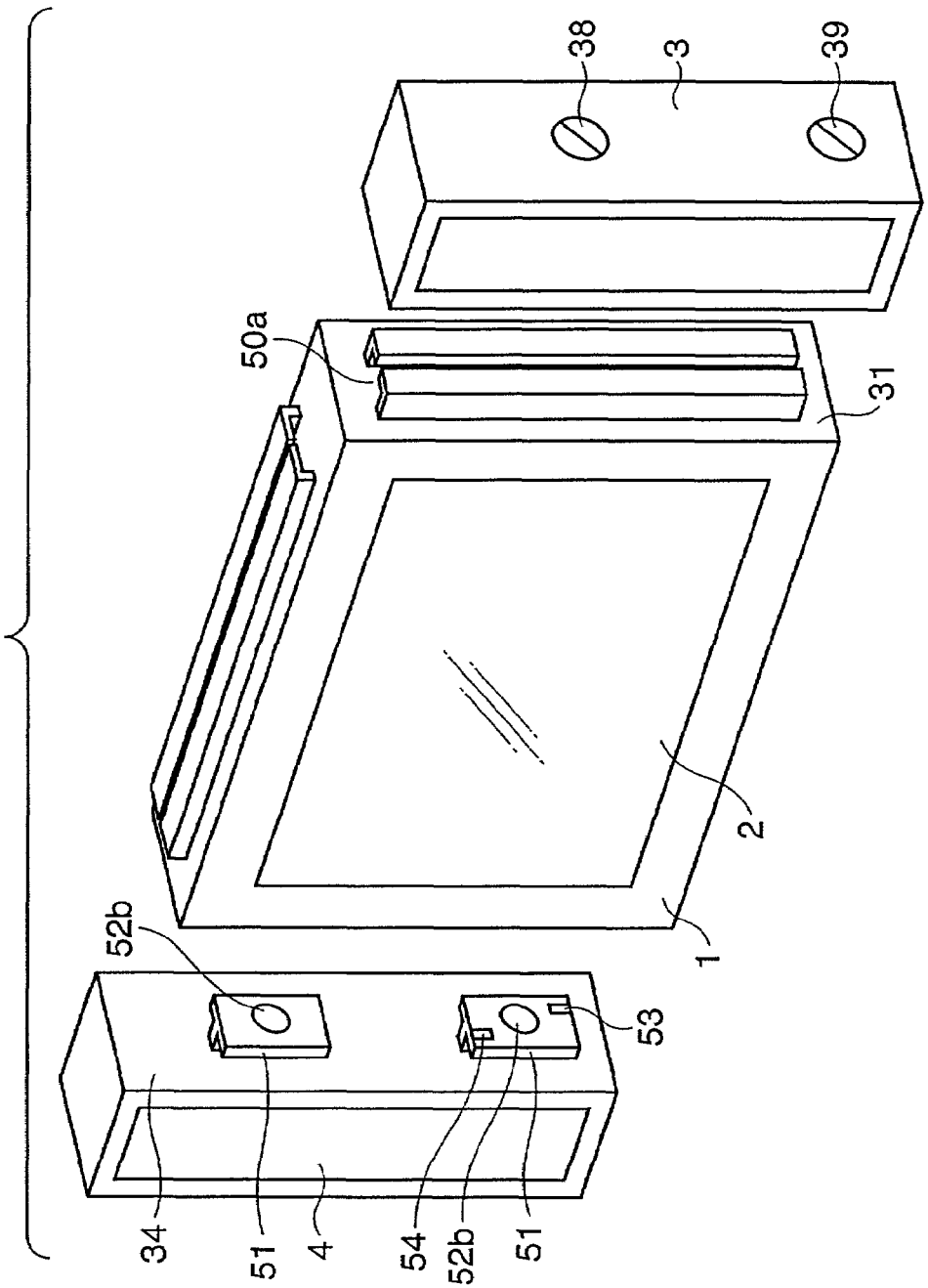

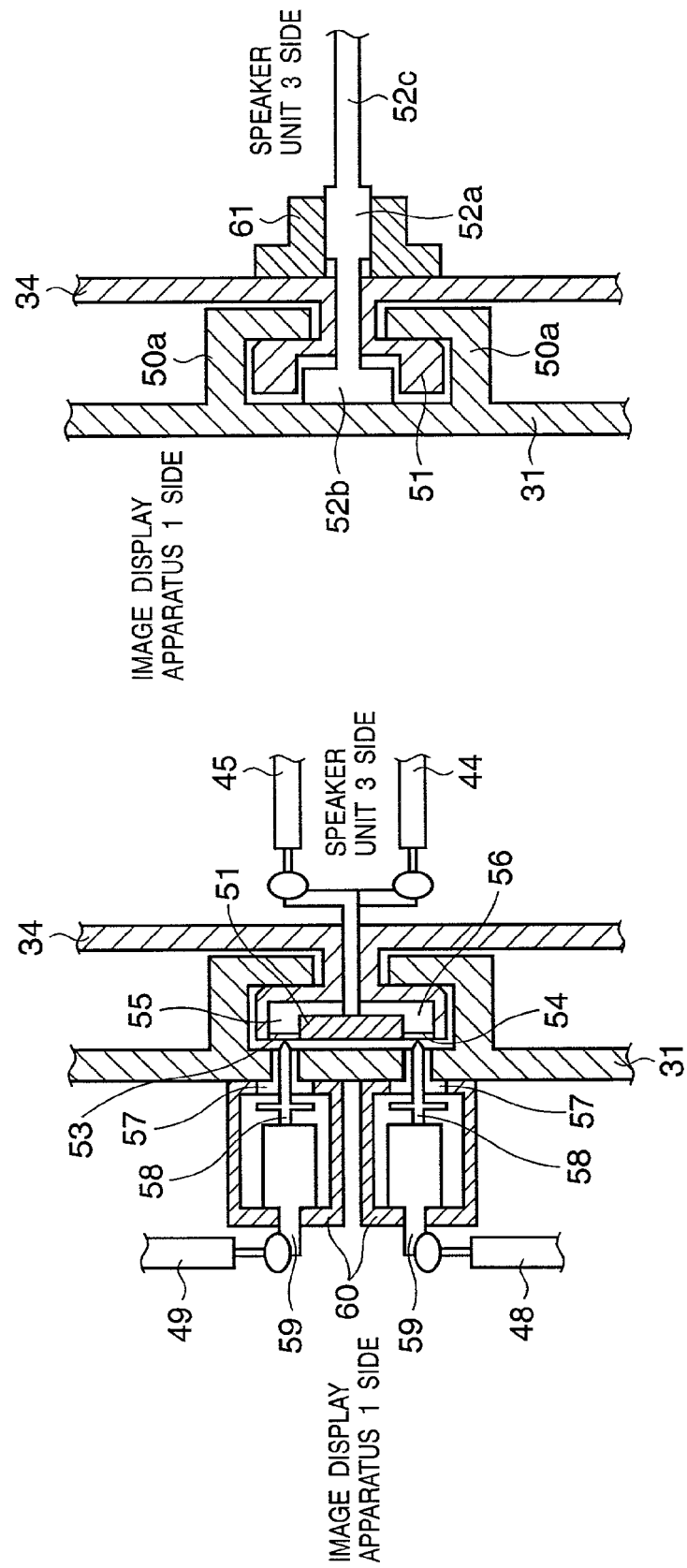

IMAGE DISPLAY SYSTEM, IMAGE DISPLAY APPARATUS AND PERIPHERAL DEVICES OF IMAGE DISPLAY APPARATUS

FIELD OF THE INVENTION

The present invention relates to an image display apparatus such as a TV set, and more specifically, to a structure of connection between an image display apparatus and peripheral devices.

BACKGROUND OF THE INVENTION

Thin, flat type image display apparatuses such as display apparatuses using electron emission elements, display apparatuses using plasma discharge, display apparatuses using LCD and display apparatuses using a vacuum fluorescent display are used for applications such as TV, computer terminals, advertising media and signs.

What has been a focus of attention in recent years is a wall-mounting type TV set with a screen size of 40 inches or more, and whether the screen size is 40 inches or 50 inches, one of their features is the space saving feature with the screen display section having a depth of 100 mm or less.

On the other hand, such an image display apparatus comes with a variety of peripheral devices such as an image/sound reproduction apparatus such as a speaker unit, video cassette recorder or interface apparatus such as a set top box that incorporates various input signal sources. A conventional example of such an image display apparatus and peripheral device will be explained with reference to the attached drawings.

FIG. 9 is a schematic diagram of the conventional example of an image display apparatus and peripheral device viewed from the back. In the figure, an image display apparatus 100 is constructed of a plasma display, etc. and a plasma display module and electrical circuit, etc. are housed in an outer casing. A left speaker unit 101 and right speaker unit 102 are attached to the image display apparatus 100 in a detachable manner.

Signal input/output section 103 is a section for inputting/outputting an image or sound signal to/from the image display apparatus 100 and a speaker support plate 104 is a section for mounting the right and left speaker units 101 and 102 on the image display apparatus 100. The speaker support plate 104 is provided with through holes 105 and the image display apparatus 100 is provided with female threads 106 and the speaker unit 101 is provided with female threads 107. Fixing screws 108 are passed through the through holes 105 of the speaker support plate 104 and screwed into the female threads 106 provided on the image display apparatus 100 or screwed into the female threads 107 provided on the speaker unit.

Input terminals 109 are provided on the right and left speaker units 101 and 102 and input with sound signals. Sound cables 110 transmit sound signals from the image display apparatus 100 to the right and left speaker units 101 and 102. A power supply cable 111 is a cable for supplying power to the image display apparatus 100.

A video cassette recorder 112 is an apparatus for reproducing video images and sound/image signal output cables 113 are cables for transmitting sound and image signals from the video cassette recorder 112 to the image display apparatus 100. A power supply cable 114 is a cable for supplying power to the video cassette recorder 112.

Mounting the image display apparatus in such a conventional configuration on the wall requires a space to pass cables on the back and installing the image display apparatus separate from the wall for that space ends up sacrificing the intended space-saving feature, particularly in the case of a thin type image display apparatus. Moreover, the exposure to the wall surface of connection cables between the image display apparatus and other devices, for example, a video cassette recorder looks awful. In addition, when the speakers are attached or detached, the image display apparatus needs to be taken off the wall, which is problematic in terms of maintenance.

On the other hand, in the case where the image display apparatus is installed on a stand, it is also necessary to secure a space for housing various cables on the back and separate the stand from the wall surface, which sacrifices the space-saving feature again. Moreover, cables of various voltages and frequencies intertwined on the back may adversely affect the electrical circuit and even deteriorate the quality of images.

New types of recording devices and communication devices have made their debut in recent years and thin flat type image display apparatuses are expected to be further developed as terminal apparatuses for those devices in the future. However, connections between an image display apparatus and its peripheral devices will be more and more complicated in order to conform to new systems and there is also a fear of wire connection errors.

Further, a variety of peripheral devices and image display apparatuses require layouts with a functional variety to be provided and user's tastes for layouts of peripheral devices and image display apparatuses are more and more diversified.

SUMMARY OF THE INVENTION

It is an object of the present invention to minimize cables for electrical connections between an image display apparatus and peripheral devices, reduce the size of the entire apparatus and make it possible to adopt a variety of layouts.

The present invention provides an image display system comprising:

an image display apparatus provided with a first electrode;

peripheral devices provided with a second electrode, which can be mounted onto the above-described image display apparatus; and a guide for forming a path when the mounting position of the above-described peripheral devices on the above-described image display apparatus are moved, wherein the above-described first electrode is placed at the above-described plurality of mounting positions along the above-described guide in such a way as to contact the above-described second electrode.

The present invention allows the image display apparatus to be electrically connected to the peripheral devices without cables. This makes it possible to send/receive signals without cables or supply power from one side to another. Moreover, since the mounting positions can be moved along the guide and the first and second electrodes contact at a plurality of positions, it is possible to select a plurality of mounting positions.

The present invention can use rails provided on the above-described image display apparatus as the above-described guide.

Further, the present invention can use an opening or groove provided on the above-described image display apparatus as the above-described guide.

Further, the present invention can place the above-described first electrode along the above-described path.

Further, the present invention can be constructed in such a way that at least part of the above-described guide also serves as the above-described first electrode.

Thus, it is desirable to construct at least part of the above-described guide with a conductive material so that the above-described guide also serves as the first electrode. Furthermore, constructing the entire guide with a conductive material or providing a conductive material along the full length of the guide makes it possible to realize electrical connection of the second electrode at arbitrary mounting positions.

Further, the above-described image display apparatus of the present invention includes a rectangular image display plane and it is desirable that the image display apparatus have the above-described image display plane with a diagonal of 20 inches or more.

The present invention has an advantage of being able to change the mounting positions of peripheral devices and this advantage is especially conspicuous when the display apparatus has a large screen, or more specifically when the width across corners of the display plane is 20 inches or more. Furthermore, this becomes a particularly conspicuous advantage when the width across corners is 30 inches or more or 40 inches or more. The maximum width across corners may be about 100 inches.

Furthermore, the present invention can also adopt a spherical shape for the above-described first and second electrodes. This makes it possible to reduce friction and implement smooth movement of the mounting positions.

In this case, it is also possible to provide an elastic material to support the above-described spherical first electrode or second electrode. This makes the contact between both electrodes more reliable.

Furthermore, the present invention provides an image display apparatus capable of mounting peripheral devices, comprising:

a guide for forming a path when the mounting positions of the above-described peripheral devices on the above-described image display apparatus are moved; and electrodes that contact electrodes provided on the above-described peripheral devices, wherein the above-described electrodes of the above-described image display apparatus are placed so as to contact the above-described electrodes of the above-described peripheral devices at the above-described plurality of mounting positions along the above-described guide.

Furthermore, the present invention provides a peripheral device for an image display apparatus which can be mounted on the image display apparatus, wherein the mounting position of the above-described peripheral device can be moved along the guide provided on the above-described image display apparatus and electrodes that contact the electrodes provided for the above-described image display apparatus are provided at the above-described plurality of mounting positions.

Furthermore, the present invention provides an image display system comprising an image display apparatus and peripheral devices mounted on the above-described image display apparatus in such a way that the mounting positions are movable, wherein the above-described image display apparatus includes a first electrode to electrically connect to the above-described peripheral devices, the above-described peripheral devices include a second electrode to electrically connect to the above-described image display apparatus, the above-described first and second electrodes are placed in such a way as to have contact with each other at the above-described plurality of mounting positions.

Furthermore, the present invention provides an image display apparatus on which peripheral devices are mounted in such a way that the mounting positions are movable, comprising electrodes that contact the electrodes provided on the above-described peripheral devices, wherein the above-described described electrodes of the above-described image display apparatus are placed so as to contact the above-described electrodes of the above-described peripheral devices at the above-described plurality of mounting positions.

Further, the present invention provides a peripheral device for an image display apparatus mounted on the image display apparatus in such a way that the mounting position is movable, comprising electrodes that contact the electrodes provided on the above-described image display apparatus, wherein the above-described electrodes of the above-described peripheral device are placed so as to contact the above-described electrodes of the above-described image display apparatus at the above-described plurality of mounting positions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6B is a cross-sectional view showing an essential part of a structure of a connection section between the image display apparatus 1 and a center speaker unit 200 in the second embodiment;

FIG. 7 is an external view of an image display system according to a third embodiment of the present invention;

FIG. 8A is a cross-sectional view showing an essential part of a structure of an electrical connection section between an image display apparatus 1 and a speaker unit 3 in the third embodiment;

FIG. 8B is a cross-sectional view showing an essential part of a structure of a mechanical connection section between the image display apparatus 1 and the speaker unit 3 in the third embodiment.

DETAILED DESCRIPTION OF THE PREFERRED EMBODIMENTS

Preferred embodiments of the present invention will now be described in detail in accordance with the accompanying drawings.

First Embodiment

Figure 1:
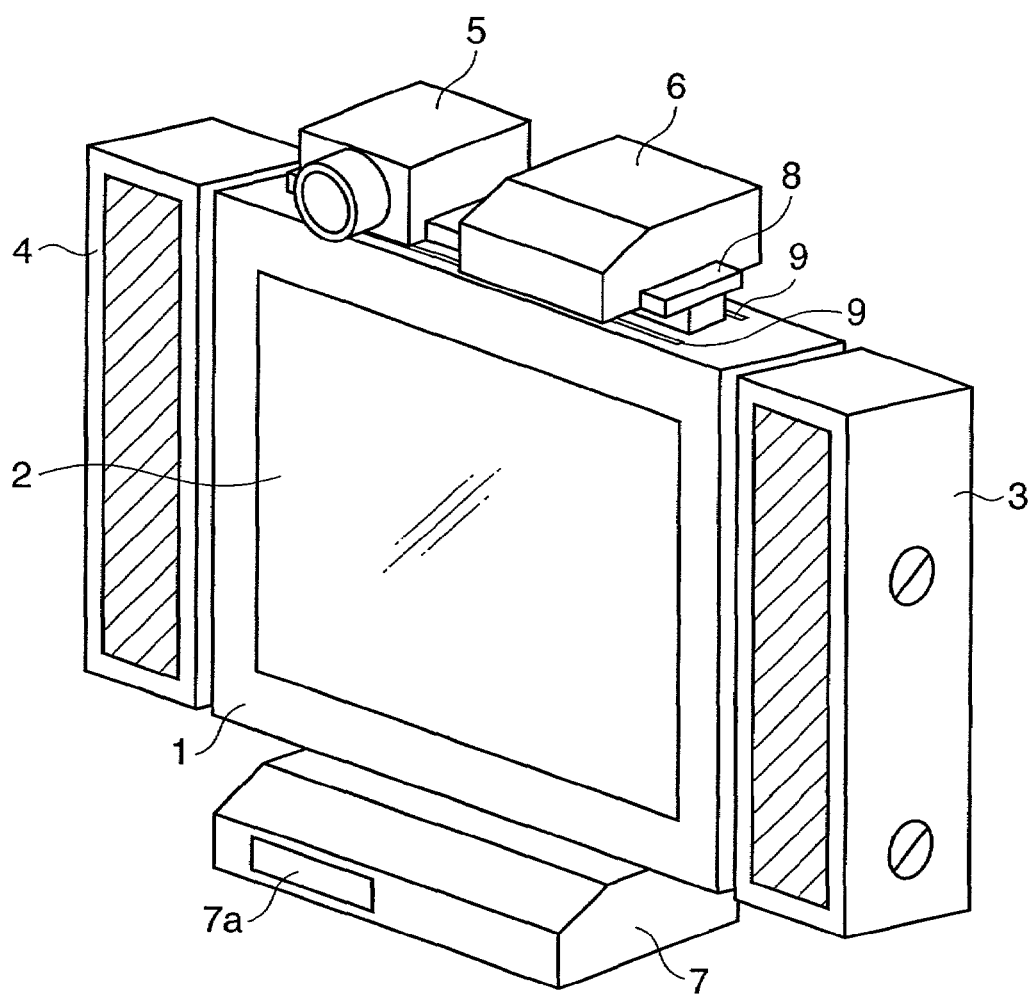
FIG. 1 is an external view of an image display system according to a first embodiment of the present invention.

FIG. 1 is an external view of an image display system according to a first embodiment of the present invention.

This image display system includes an image display apparatus 1 having an image display section 2, peripheral devices that can be freely attached to or detached from the image display apparatus 1, that is, speaker units 3 and 4, a camera 5, a set top box 6 that incorporates a signal conversion circuit having the function of inputting/outputting various signals, and a stand unit 7 that incorporates a recording/reproduction device.

Examples of the image display apparatus 1 are thin type image display apparatuses using a display panel such as SED, PDP, liquid crystal, EL. The stand unit 7 not only supports the image display apparatus 1 but also loads information of a recording medium inserted from a recording medium insertion section 7a and outputs it as an image signal or sound signal to the image display apparatus 1.

Furthermore, in FIG. 1, rails 8 having a T-figured section are provided on the top, bottom, right and left sides of the image display apparatus 1 and these rails 8 are formed as integral part of the image display apparatus 1 (outer facing). A pair of linear electrodes 9 (hereinafter referred to as "rail electrodes 9") is provided on the top surface of the image display apparatus 1 in the longitudinal direction of the rail 8 on both sides of the rail 8. These electrodes 9 are used to supply power to the camera 5 and set top box 6 by adding a DC voltage from the image display apparatus 1 and connected electrically with a power cable, which will be described later, inside the image display apparatus 1.

Figure 2:
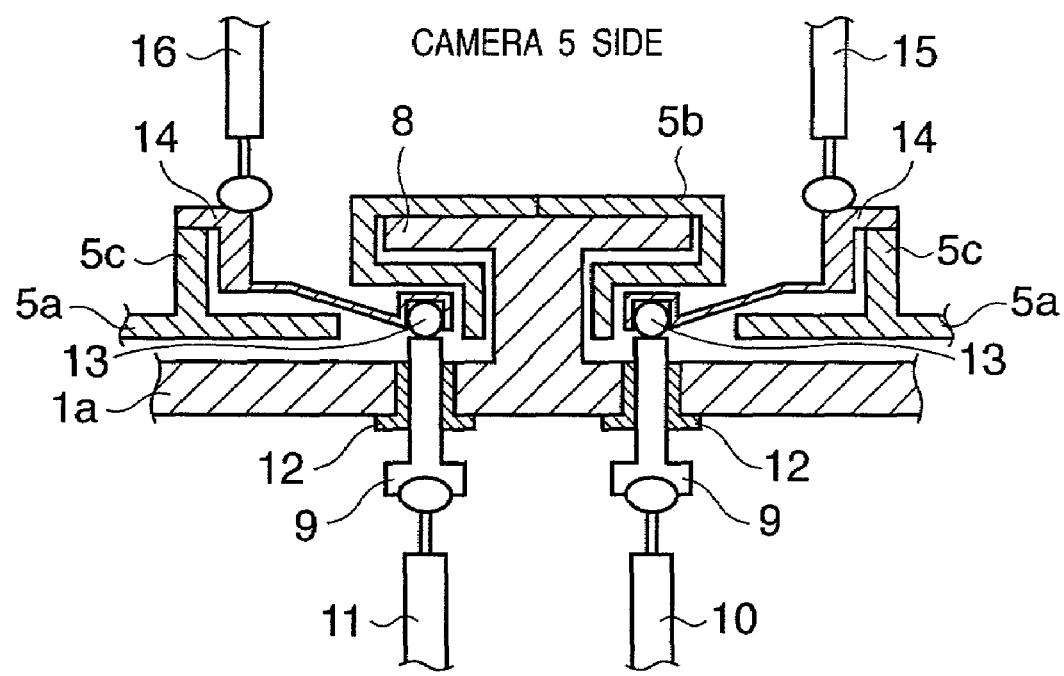
FIG. 2 is a cross-sectional view showing an essential part of a structure of an electrical connection section between an image display apparatus 1 and a camera 5 in the first embodiment.

FIG. 2 is a cross-sectional view showing an essential part of a structure of a connection section between the image display apparatus 1 and camera 5, and shows a structure of an electrical connection section in particular. By the way, the connection section between the image display apparatus 1 and set top box 6 also has a similar structure.

The outer facing 1a protects the interior of the image display apparatus 1 and improves the appearance, while the outer facing 5a protects the interior of the camera 5 and improves the appearance. The concave section 5b is provided for the camera 5 and is a section that engages with the rail 8. With the rail 8 and concave section 5b engaged as shown in the figure, the camera 5 can be mounted on the image display apparatus 1.

A power supply (+) cable 10 and power supply (−) cable 11 are provided inside the image display apparatus 1. These cables are intended to supply a voltage generated by a DC power supply (not shown) inside the image display apparatus 1 to the camera 5.

An insulation material 12 insulates between the outer facing 1a and rail electrodes 9 of the image display apparatus. Ball electrodes 13 are provided for the camera 5, contact the rail electrodes 9 and function as electrodes that enable an electrical connection between the image display apparatus 1 and camera 5. Support sections 14 have an edge shaped so as to support the ball electrodes 13 so that the ball electrodes 13 do not come off and are made of a material having conductivity and elasticity. These support sections 14 always press the ball electrodes 13 against the rail electrodes 9 by means of spring to insure the contact between the rail electrodes 9 and ball electrodes 13, and are fixed to the outer facing 5a via support sections 5c. This embodiment has a construction whereby the ball electrodes 13 are supported with the support sections 5c having elasticity, but instead of this, it is also possible to adopt electrodes made of an elastic material that merge these parts.

The interior of the camera 5 is provided with a power supply (+) cable 15 and power supply (−) cable 16 and each cable is connected to the rear edge of the support section 14. In this way, the power supply (+) cable 10 and power supply (−) cable 11 of the image display apparatus 1 are electrically connected to the power supply (+) cable 15 and power supply (−) cable 16 of the camera 5 via the rail electrodes 9, ball electrodes 13 and support sections 14.

Figure 3:
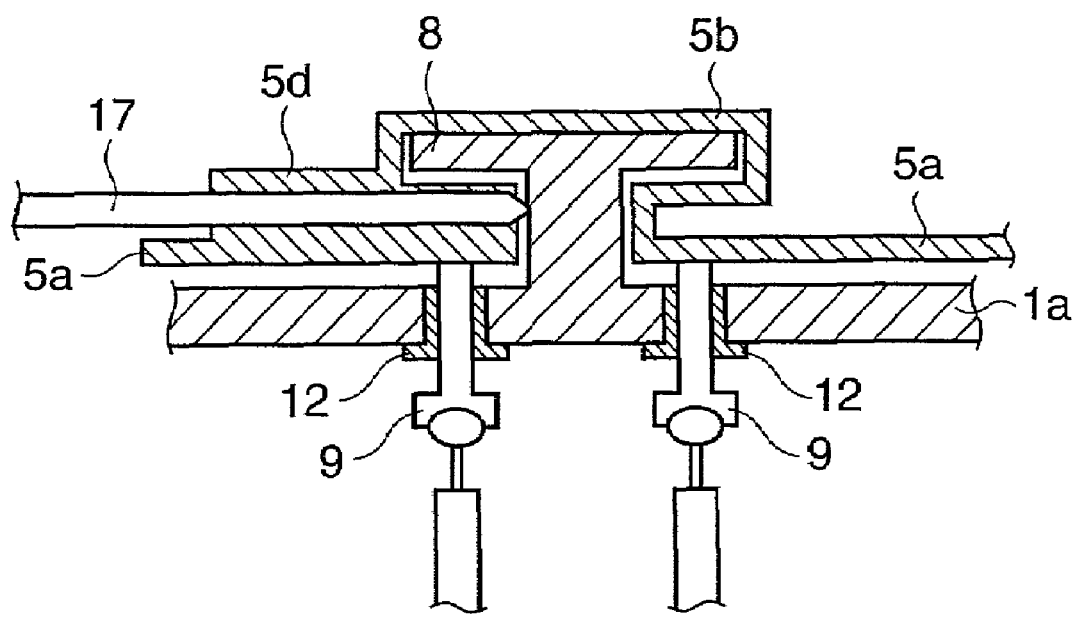
FIG. 3 is a cross-sectional view showing an essential part of a structure of a mechanical connection section between the image display apparatus 1 and the camera 5 in the first embodiment.

Then, FIG. 3 is a cross-sectional view showing an essential part of a structure of the connection section between the image display apparatus 1 and camera 5 and shows especially a mechanical connection section. The connection section between the image display apparatus 1 and set top box 6 also has a similar structure.

A female-tapped hole section 5d is provided near the concave section 5b of the camera 5. A set screw 17 is fitted into the female-tapped hole section 5d and the edge of the penetrating set screw presses one side of the rail 8 and thereby fixes the camera 5 to the image display apparatus 1. This set screw 17 can be fitted into the female-tapped hole section 5d by inserting and turning a screw driver from a front hidden hole (not shown).

When the camera 5 is mounted on the image display section 1 with such a structure, the concave section 5b of the camera 5 is engaged with the rail 8 from the edge of the rail 8 and the camera can be placed at an arbitrary position by sliding the camera 5 along the rail 8 and it is thereby possible to adopt a variety of layouts. In this case, since the ball electrodes 13 of the camera 5 always contact the rail electrodes 9 pressed by means of spring against the support sections 14 as described above, the image display apparatus 1 is electrically connected to the camera 5.

Figure 4:
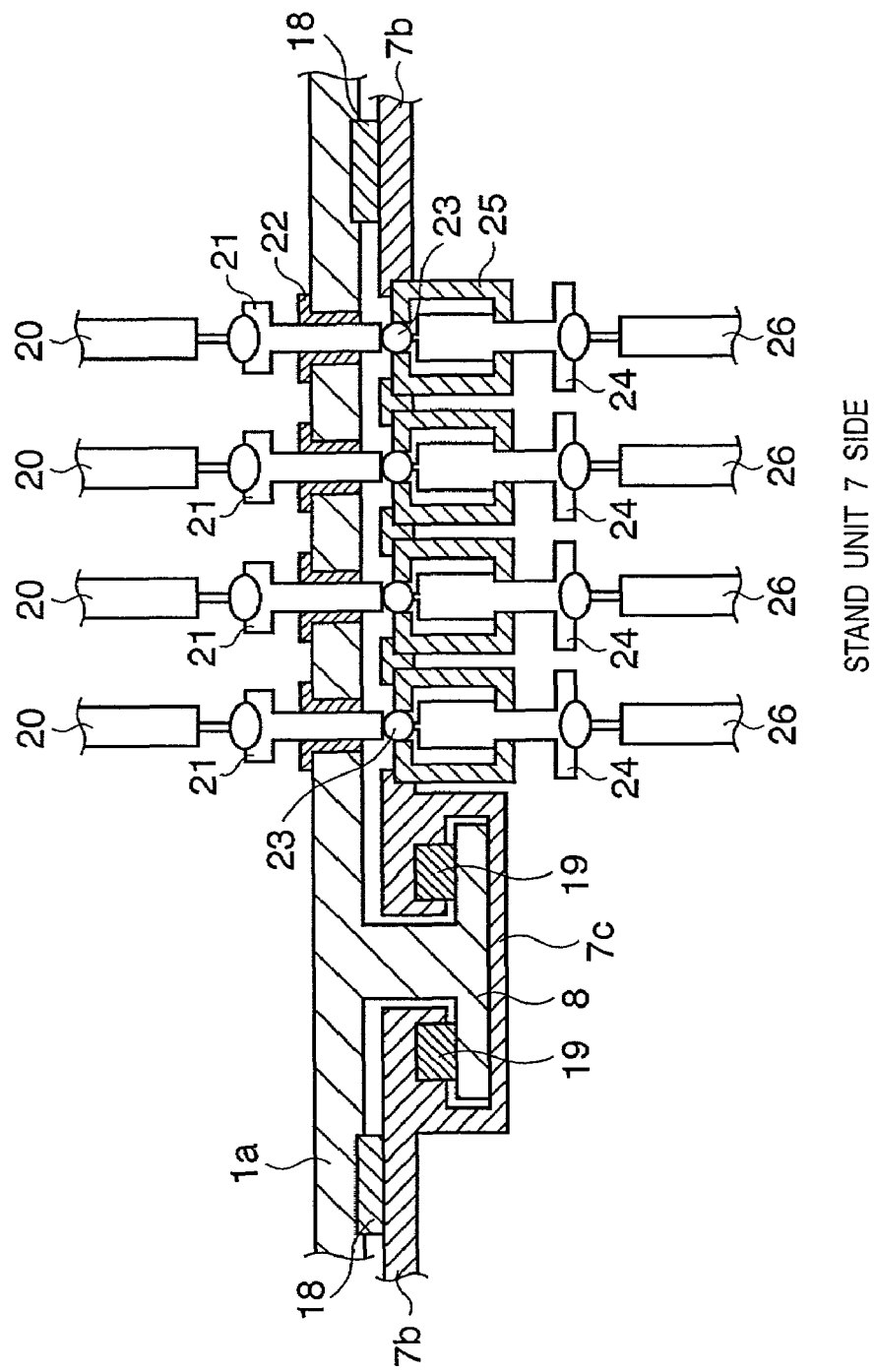
FIG. 4 is a cross-sectional view of an essential part of the image display apparatus and an external device in the first embodiment.

Then, a structure of connection between the image display apparatus 1 and stand unit 7 will be explained. FIG. 4 is a cross-sectional view showing an essential part of a structure of the connection section between the image display apparatus 1 and stand unit 7. The configurations with the same reference numerals in the figure as those in FIG. 1 to FIG. 3 denote the same configurations.

An outer facing 7b protects the interior of the stand unit 7 and improves the appearance and the concave section 7c allows the stand unit 7 to engage with the rail 8 provided on the bottom face of the image display apparatus 1. This concave section 7c allows the stand unit 7 to be connected to the image display apparatus 1.

A sliding support section 18 reduces frictional resistance when the concave section 7c engaged with the rail 8 is slid along the rail 8 and supports the image display apparatus 1 thus coupled with the stand unit in a well-balanced posture. A plate spring 19 prevents backlash when the concave section 7c is slid engaged with the rail 8. Input signal cables 20 are provided inside the image display apparatus 1 and transmit electrical signals to a signal processing circuit (not shown) inside the image display apparatus 1.

Electrodes 21 are placed linearly in parallel with the rail 8 and are conductive electrodes (hereinafter referred to as "rail electrodes 21") placed in such a way that they slightly stick out of the surface of the outer facing 1a and connected electrically and mechanically with the input signal cables 20. Insulation materials 22 insulate between the outer facing 1a of the image display apparatus 1 and rail electrodes 21. Ball electrodes 23 are placed on the stand unit 7 side and contact the rail electrodes 21 mechanically and electrically. Spring sections 24 always press the ball electrodes 23 against the rail electrodes 21 by means of spring and are connected electrically and mechanically with power cables, which will be described later. These spring sections 24 have elasticity and conductivity.

Insulation holders 25 have edges shaped in such a way as to hold the ball electrodes 23 so that they do not come off, and at the same time support the spring sections 24. These insulation holders 25 keep the outer facing 7b of the stand unit 7 insulated from electrical signals that flow through the ball electrodes 23. Inside the stand unit 7, a plurality of output signal cables 26 is routed, connected electrically and mechanically with the spring sections 24 and connected to an electrical circuit (not shown) that controls recording/reproducing means incorporated in the stand unit 7.

With such a structure, when the stand unit 7 is connected to the image display apparatus 1, the concave section 7c of the stand unit 7 is engaged with the rail 8 from the edge of the rail 8 and the stand unit 7 can be slid along the rail 8 in that position. By moving the stand unit 7 along the rail 8 through a specified path, it is possible to place the stand unit 7 at an arbitrary position on the rail 8 and thereby adopt a variety of layouts.

In this case, since the ball electrodes 23 of the stand unit 7 always contact the rail electrodes 21 pressed by means of the spring sections 24 as described above, the image display apparatus 1 is electrically connected to the stand unit 7, which connects the output signal cables 26 with the input signal cables 20 electrically, making it possible to send electrical signals from the stand unit 7 to the image display apparatus 1. It goes without saying that it is possible, through the same configuration, to send electrical signals from the image display apparatus 1 to the stand unit 7.

Then, the above-described first embodiment will be explained further below.

In the cabinet structure of the image display apparatus 1, and more particularly the support structure of the image display section 2 inside, the section corresponding to the four sides of the frame viewed from the front can support the four sides of the image display section 2 from the front and back. Each side of this section is formed through metal extrusion, then cut to a predetermined length and formed into a quasi-rectangle by fixing means such as screws. Extrusion processing makes it possible to manufacture a continuous identical shape relatively easily and produce the rail 8 without any additional costs and form the rail 8 for all the four sides that make up the frame. The first embodiment can use these sides effectively.

When the image display apparatus 1 is used as a monitor of communication means, for example, video information, etc. from the other end of communication is received and converted by the set top box 6, displayed on the image display apparatus 1 and further, the speaker units 3 and 4 can output sound.

On the other hand, the video information, etc. from this side is converted to an electric signal by the camera 5 and sound is converted to an electric signal by a microphone {not shown} built in the camera 5 and these electric signals are converted to communication signals by the set top box 6 and can be transmitted to the other end of communication.

An external power supply for enabling the functions of the camera 5 and set top box 6 is not required because a DC current from a constant power supply inside the image display apparatus 1 is supplied through the aforementioned structure (contact between the rail electrodes 9 and ball electrodes 13). A power supply is disconnected by loosening the set screw 17 and removing the camera 5 and the set top box 6 from the rail 8, and therefore there is no fear of misoperation when the apparatus is not used.

The reason that the rail 8 is used for electrical connection is to allow the camera 5 and set top box 6 to function and operate at an arbitrary position of the top face of the image display apparatus 1, providing a variety of layouts, and the reason that the support sections 14 and ball electrodes 13 are combined for the connection section is to reduce frictional resistance when the camera 5 or set top box 6 is attached or detached and to increase the weight per unit area during electrical connection to improve the connection reliability.

In the structure whereby the stand unit 7 is fixed using the rail 8 to the bottom face of the image display apparatus 1, the reason that the rail electrodes 21 and ball electrodes 23 are used for the electrical connection section between the image display apparatus 1 and stand unit 7 is the same reason for the connection between the camera 5 or set top box 6 and the image display apparatus 1, and so explanations thereof will be omitted. An image signal or sound signal, etc. is sent from recording means (not shown) which is built in the stand unit 7, and therefore a plurality of wires may be required and this can be handled by combining the plurality of rail electrodes 21 and ball electrodes 23 as shown in the figure.

In this case, four wires are used in the figure, but the structure may be configured to combine a required number of wires and if power needs to be supplied from the image display apparatus 1 to the camera 5 and set top box 6, etc., it may be arranged that the rail electrodes 21 and ball electrodes 23 are set in a free space near the rail 8 for the power supply.

Furthermore, this embodiment describes the case where power supply and transmission/reception of electrical signals are performed between the image display apparatus 1 and peripheral devices 3 to 7, but it goes without saying that it is also possible to supply power directly and carry out transmission/reception of electrical signals by electrically connecting between the peripheral devices 3 to 7 via the image display apparatus 1. This can be implemented by simply shorting the rail electrodes 9 and 21 of the image display apparatus corresponding to, for example, the two peripheral devices to be electrically connected.

Furthermore, the first embodiment uses no screws, etc. to fix the stand unit 7 to the image display apparatus 1. This is because the image display apparatus 1 is a heavy object and will not be easily disconnected. If there is some concern, it is possible to apply the structure of the set screw 17 of the camera 5 to a free space of the stand unit 7.

Examples of recording media of the recording/reproducing means built in the stand unit 7 include disk type media such as DVD and MD or cassette type media using an IC memory. Incorporating the recording/reproducing means in the stand unit 7 eliminates the need for a space for installing a 25 conventional separate type VCR or wiring cables. Moreover, making the stand unit 7 detachable from the image display apparatus 1 avoids a situation of a conventional TV set in incorporating a VCR in which the function of the image display section cannot help from being stopped when maintenance of the VCR is required.

As described above, the features of the image display system according to the first embodiment are as follows:

1) Installing the rail 8 over the entire circumference of the sides of the image display apparatus 1 and using this as the structure of connection between the peripheral devices 3 to 7 allows the peripheral devices 3 to 7 to be mounted simply and as integral part of the image display apparatus.

2) Constructing the rail electrodes 9 and 21 in parallel with the rail 8 close to the rail 8 of the image display apparatus 1 and constructing an electrical connection structure at the corresponding positions of the peripheral devices 3 to 7 allows power supply and transmission/reception of electric signals without any external cables.

3) The rail structure (8, 5*b*) and set screw structure (17) make it possible to attach/detach peripheral devices (camera 5) without wrapping around cables behind the image display apparatus 1.

4) Including the recording/reproducing means in the stand unit 7 which can be attached to or detached from the image display apparatus 1 and further placing the electrode connection structure for transmission of electric signals makes it possible to display reproduced images without external cables, eliminates the need for spaces for installing the recording/reproduction apparatus and allows the recording/reproduction apparatus to be separated from the image display apparatus 1 for maintenance of the recording/reproducing means.

5) Manufacturing the convexoconcave rail formed on the quasi-entire circumference on the sides that make up the frame of the image display apparatus 1 as integral part of the support structure of the image display section using extrusion processing eliminates the need for additional processing.

6) The ability to move the mounting positions of the peripheral devices 3 to 7 with respect to the image display apparatus 1 makes it possible to select a plurality of mounting positions and adopt a variety of layouts.

Second Embodiment

Figure 5:
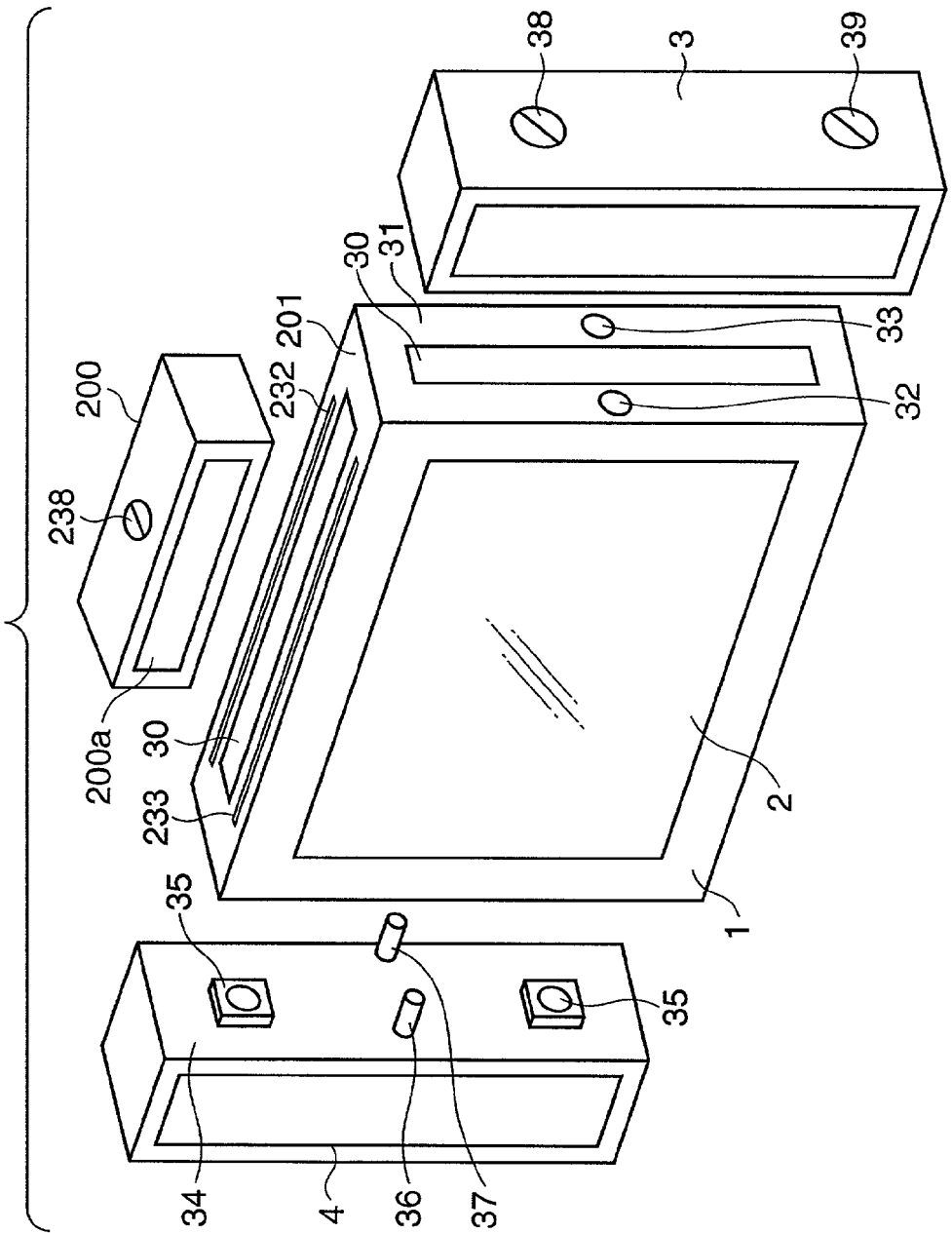
FIG. 5 is an external view of an image display system according to a second embodiment of the present invention.

FIG. 5 is an external view of an image display system according to a second embodiment of the present invention and configurations with the same reference numerals as those in the above-described first embodiment denote the same configurations. The system according to this embodiment includes speaker units 3 and 4 on the left and right sides and a center speaker unit 200 on top of the image display apparatus 1. Provision of the center speaker unit 200 can improve an acoustic characteristic of sound output to the audience.

Linear openings 30 are provided on top, bottom and right and left sides of the image display apparatus 1. Reference numeral 31 denotes the right and left sides of the image display apparatus 1, which are sides closely contacting the speaker units 3 and 4. Reference numeral 201 denotes the top face of the image display apparatus 1, which is a side closely contacting the center speaker unit 200.

Connection holes 32 and 33 are holes for electrical connection between the image display apparatus 1 and the speaker units 3 and 4, respectively and an insulation material is applied to the inside perimeter of the holes. Further, connection openings 232 and 233 are openings for electrical connections between the image display apparatus 1 and center speaker unit 200 and form linear openings quasi-parallel to the opening 30 on the top face.

Speaker unit outer facing wall surfaces 34 face the left and right sides 31 of the image display apparatus 1. Protrusions 35 stick out of the outer facing wall surfaces 34 of the speaker units 3 and 4 and are shaped so that they fit into the openings 30. Electrodes 36 and 37 are pin-shaped electrodes (hereinafter referred to as "conduction pins 36 and 37") that stick out of the speaker units 3 and 4 from inside and are located at positions where they fit into the connection hole 32 or 33 when the outer facing wall surface 31 faces the speaker unit outer facing wall surface 34.

Fixing thumb nuts 38 and 39 are thumb nuts to operate screws, which will be described later, when the speaker unit 3 or 4 is fixed to the image display apparatus 1, and locked when turned clockwise and unlocked when turned counterclockwise. Reference numeral 238 is a fixing thumb nut to operate a screw, which will be described later, when the center speaker unit 200 is fixed to the image display apparatus 1, and locked when turned clockwise and unlocked when turned counterclockwise.

Then, the structure of the connection between image display apparatus and speaker unit 3 or 4 will be explained.

Figure 6A:
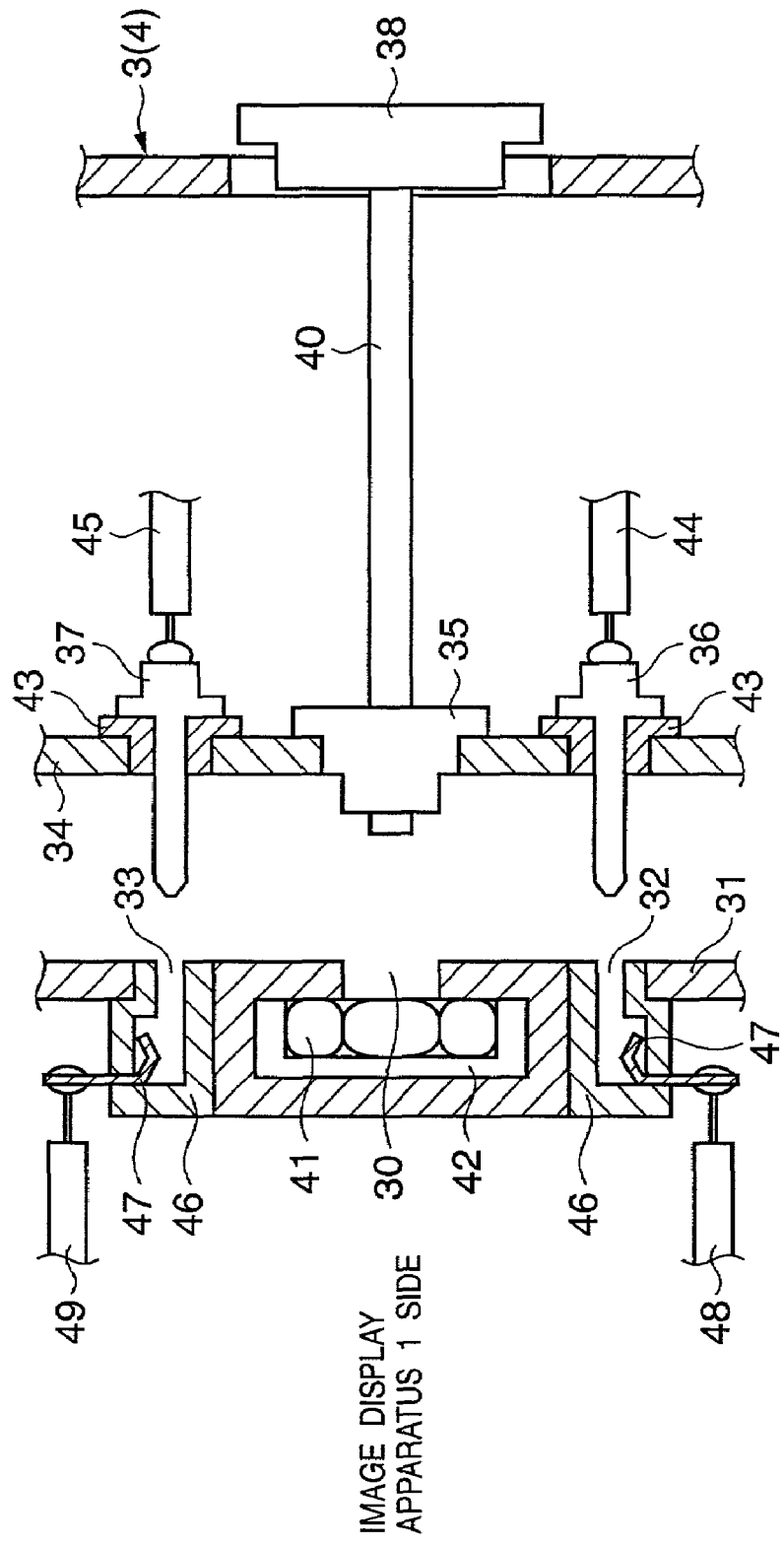
FIG. 6A is a cross-sectional view showing an essential part of a structure of a connection section between an image display apparatus 1 and a speaker unit 3 in the second embodiment.
Figure 9:
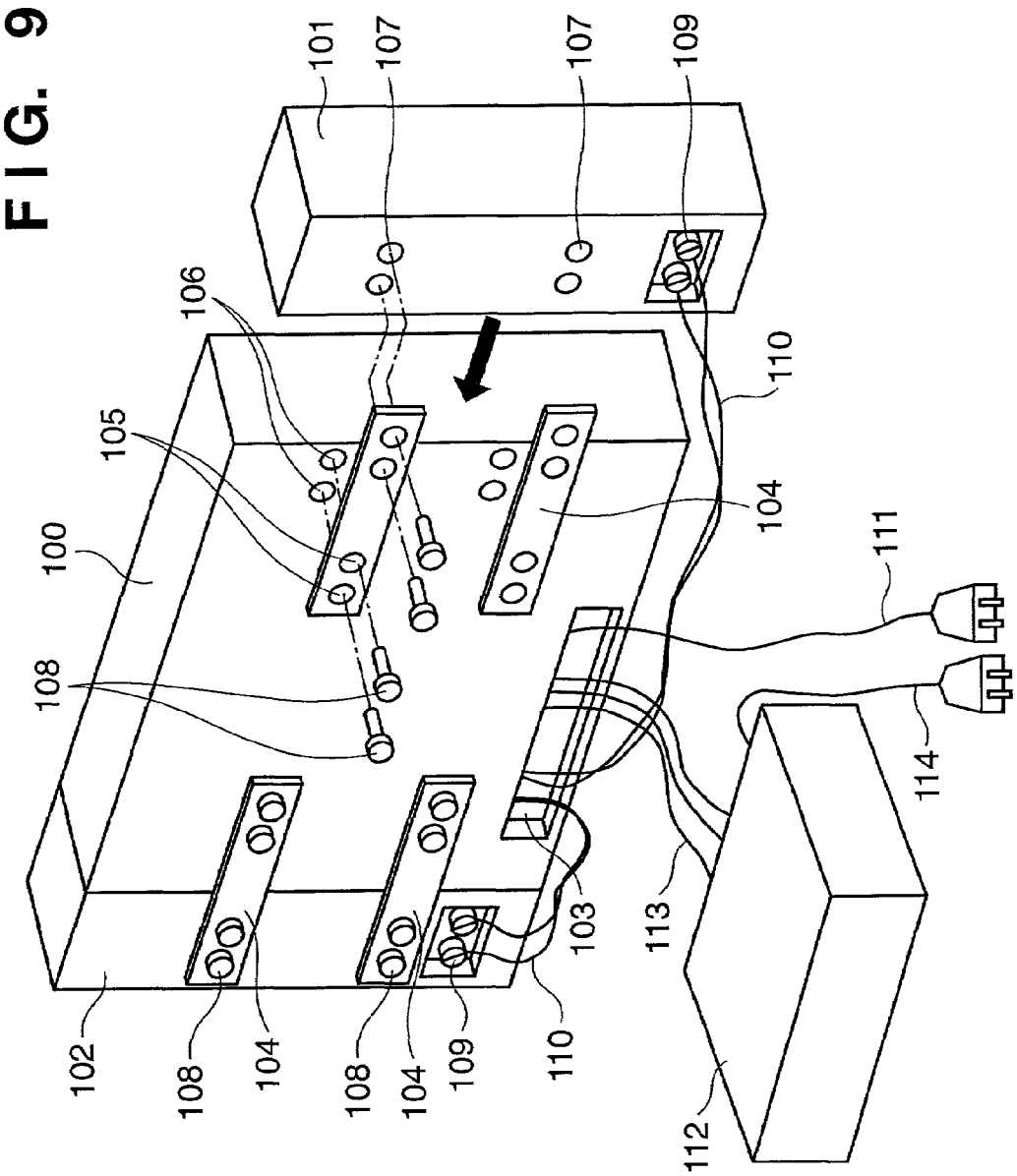
FIG. 9 is a schematic diagram showing a conventional image display apparatus and peripheral devices.

FIG. 6A is a cross-sectional view (viewed from top) showing an essential part of the structure of the connection section between image display apparatus 1 and speaker unit 3 and the connection section between the image display apparatus 1 and speaker unit 4 also has the same configuration as this.

A fixing screw 40 is a bar-shaped material for mounting the speaker unit 3 onto the image display apparatus 1, one end of which is fixed to the fixing thumb nuts 38 and 39 and the other end of which is screwed into a tapped hole of a convex section 35 of the speaker unit 3. Turning the fixing thumb nut 38 or 39 clockwise makes the fixing screw 40 penetrate the convex section 35 of the speaker unit 3, stick out and advance.

A nut 41 is placed inside the opening 30 of the image display apparatus 1, female-threaded in the center and has a structure whereby the edge of the fixing screw 40 is screwed in. A rail concave section 42 is part of the frame with four sides that support the image display section 2 of the image display apparatus 1, molded through metal extrusion, cut to a predetermined length and formed into a quasi-rectangle using fixing means such as screws. The rail concave section 42 is formed on all the four sides that make up the frame and these can be used effectively as described in the first embodiment.

An insulation material 43 secures electrical insulation between the conduction pins 36 and 37 and the outer facing wall surface 34 of the speaker unit 3. Cables 44 and 45 are routed inside the speaker unit 3, with one end fixed to the conduction pins 36 and 37 electrically and mechanically and the other end connected to speakers (not shown) in the speaker units 3 and 4. These cables 44 and 45 transmit sound amplification signals input from the conduction pin 36 or 37 to the speakers (not shown) to produce sound.

Reference numeral 46 denotes insulation holders that make up connection holes 32 and 33 of the image display apparatus 1 into which the conduction pins 36 and 37 are inserted and are made of an insulation material to keep insulation of the outer facing wall surface 31 from a current of the sound amplification signal that flows. The inner diameter of the connection holes 32 and 33 of the insulation holders 46 is larger than the diameter of the insertion parts of the conduction pins 36 and 37 by 0.1 mm to 0.2 mm.

Electrode plates 47 are materials that contact electrically the conduction pins 36 and 37 and made of a material with conductivity and elasticity and the part that makes an electrical contact has a smooth surface and gold-plated. When the conduction pins 36 and 37 are pushed into the insulation holders 46, the electrode plates 47 contact the conduction pins 36 and 37. Reference numerals 48 and 49 denote sound output cables connected to a sound amplification signal generator (not shown) inside the main unit, which are soldered to the electrode plates 47. For this soldered structure, it is also possible to use commercially available electric connection terminals.

Then, the procedure for mounting the speaker unit 3 or 4 onto the image display apparatus 1 will be explained. Suppose the image display apparatus 1 is put on the wall. The nuts 41 are set at the position where the fixing screws 40 of the speaker units 3 and 4 are screwed in. While holding either one of the speaker unit 3 or 4 by hand, the positions where the conduction pins 36 and 37 can be inserted into the connection holes 32 and 33 are checked and either one of the speaker unit 3 or 4 held by hand is pushed toward the image display apparatus 1.

Then, the edge of the fixing screw 40 is screwed into the female-threaded section of the nuts 41 by turning the fixing thumb nuts 38 and 39 clockwise. Since the nut 41 is held inside the rail concave section 42, either the speaker unit 3 or 4 comes in closer contact with the image display apparatus 1 as the fixing thumb nut 38 is turned clockwise and fixing is completed. At this time, the electrical connection between the conduction pins 36 and 37 and the electrode plate 47 is completed.

By repeating the above-described operation for the rest of the speaker unit 3 or 4, the placement of the speaker units 3 and 4 at the predetermined right and left positions of the image display apparatus 1 is completed. Furthermore, though not shown in the figure, if the speaker units 3 and 4 are fixed with a sheet-like elastic material inserted between the outer facing wall surface 34 of the speaker unit and the outer facing wall surface 31 of the main unit, it is possible to prevent chattering when speaker sound is output.

Then, the structure of the connection between the image display apparatus 1 and center speaker unit 200 will be explained. The structure of the connection, which will be described below, is similar to the structure of the connection between the above-described image display apparatus 1 and speaker units 3 and 4, but is different in that the mounting position can be moved.

FIG. 6B is a cross-sectional view (viewed from one side) showing an essential part of the structure of the connection between the image display apparatus 1 and center speaker unit 200.

A fixing screw 240 is a bar-shaped material for mounting the center speaker unit 3 onto the image display apparatus 1, one end of which is fixed to the fixing thumb nut 238 and the other end of which is screwed into the tapped hole of the convex section 235 of the center speaker unit 200. Turning the fixing thumb nut 238 clockwise makes the fixing screw 240 penetrate the convex section 235 of the speaker unit 200, stick out and advance.

A hexagon nut 241 is placed inside the rail concave section 242 constructed inside the opening 30 of the image display apparatus 1, female-threaded in the center and has a structure whereby the edge of the fixing screw 240 is screwed in. The width of the internal space of the rail concave section 242 is a degree of width that the hexagon nut 241 will not turn and the hexagon nut 241 can move in the longitudinal direction of the rail concave section 242.

The rail concave section 242 is part of the frame with four sides that support the image display section 2 of the image display apparatus 1, molded through metal extrusion, cut to a predetermined length and formed into a quasi-rectangle using fixing means such as screws.

Insulation materials 243 secure electrical insulation between conduction pins 236 and 237 and an outer facing wall surface of the speaker unit 200. Cables 244 and 245 are routed inside the speaker unit 200, with one end fixed to the conduction pins 236 and 237 electrically and mechanically and the other end connected to a speaker 200a of the speaker unit 200. These cables transmit sound amplification signals input from the conduction pin 236 or 237 to the speaker 200a to produce sound.

Reference numeral 246 denotes insulation holders that make up connection holes 232 and 233 of the image display apparatus 1 into which the conduction pins 236 and 237 are inserted and are made of an insulation material to keep insulation of the top face 201 of the image display apparatus from a current of the sound amplification signal that flows. It is preferred that the inner diameter of the connection holes 232 and 233 of the insulation holders 246 be larger than the diameter of the insertion parts of the conduction pins 236 and 237 by 0.1 mm to 0.2 mm.

Electrode plates 247 are materials that contact electrically the conduction pins 236 and 237 and made of a material with conductivity and elasticity and the part that makes electrical contact has a smooth surface and gold-plated. The electrode plates 247 have a convex shape so as to contact the conduction pins 236 and 237 when the conduction pins 236 and 237 are pushed into the insulation holders 246. The electrode plates 247 are also formed in a band-shape along the longitudinal direction of the connection holes 232 and 233. Therefore, the conduction pins 236 and 237 contact the electrode plates 247 when inserted at any position of the connection holes 232 and 233.

Sound output cables 248 and 249 are connected to a sound amplification signal generator (not shown) inside the main unit and soldered to the electrode plates 247. For this soldered structure, it is also possible to use commercially available electric connection terminals.

Then, the procedure for mounting the center speaker unit 200 onto the image display apparatus 1 will be explained. Suppose the image display apparatus 1 is put on the wall.

First, the hexagon nut 241 is moved in the rail concave section 242 so that the position of the fixing screw 240 of the center speaker unit 200 matches the position of the hexagon nut 241. Then, while inserting the conduction pins 236 and 237 into the connection holes 232 and 233 and inserting the bottom of the convex section 235 into the opening 30, the center speaker unit 200 is pressed toward the image display apparatus 1.

Then, the edge of the fixing screw 240 is screwed into the female-threaded section of the hexagon nut 241 by turning the fixing thumb nut 238 clockwise. Here, instead of completely coupling the fixing screw 240 and hexagon nut 241, if the fixing screw 240 is screwed midway into the female-threaded section of the hexagon nut 241, it is possible to move the center speaker unit 200 along the path specified by the opening 30 on the top face of the image display apparatus 1 while mounted on the image display apparatus 1, and select an arbitrary mounting position. Since the bottom section of the convex section 235 of the center speaker unit 200 is inserted in the opening 30 of the image display apparatus 1, the mounting position of the center speaker unit 200 can be smoothly moved guided by the opening 30.

Once the mounting position of the center speaker unit 200 is determined, the fixing thumb nut 238 is further turned clockwise to completely couple the fixing screw 240 with the hexagon nut 241. Since the hexagon nut 241 is held inside the rail concave section 242, the center speaker unit 200 comes in closer contact with the image display apparatus 1 as the fixing thumb nut 238 is turned clockwise and fixing is completed. At this time, the conduction pins 236 and 237 contact the electrode plates 247 and the electrical connection is completed. Since the electrode plates 247 are bar-shaped along the longitudinal direction of the connection holes 232 and 233, both are electrically connected regardless of the position of the connection holes 232 and 233 at which the conduction pins 236 and 237 are inserted.

As described above, the features of the second embodiment are as follows:

1) It is possible to mount a plurality of speaker units with a sound generation function onto the top face and sides making up the frame of the image display apparatus 1 as integral part of the image display apparatus.

2) It is possible to supply a sound amplification signal from the image display apparatus 1 to the speaker units without external cables.

3) It is possible to attach/detach the speaker units 3 and 4 or the center speaker unit 200 without wrapping around cables on the back of the image display apparatus 1.

4) It is possible to manufacture the opening 30 and rail concave sections 42 and 242 formed on the quasi-entire circumference on the sides that make up the frame of the image display apparatus 1 as integral part of the frame of the image display apparatus 1 using extrusion processing eliminating the need for additional processing.

5) The ability to select the mounting position of the center speaker unit 200 as appropriate makes it possible to adopt a variety of layouts.

Third Embodiment

FIG. 7 is an external view of an image display system according to a third embodiment of the present invention and configurations with the same reference numerals as those in the above-described first and second embodiments denote the same configurations.

A rail section 50*a* has a quasi-[ ]-shaped section and is rail-shaped and makes up part of the frame with four sides of the image display apparatus 1. This rail section 50*a* is molded through metal extrusion, cut to a predetermined length and formed into a quasi-rectangle. The rail section 50*a* is formed on all the four sides that make up the frame of the image display apparatus 1.

A rail insertion section 51 is shaped so that it is engaged with and slid along the rail section 50*a* of the image display apparatus 1, and provided on the left and right speaker units 3 and 4. A fixing screw thrusting section 52*b* is provided inside an opening in the center of the rail insertion section 51 and can zoom in and out from the above-described opening by turning a fixing thumb nut, which will be described later.

Electrodes 53 and 54 are provided on the surface of the rail insertion section 51 so as to have electrical contact with the image display apparatus 1 and have a flat surface. The electrode 53 is maintained at a positive potential while the electrode 54 is maintained at a negative potential to receive a sound amplification signal.

FIG. 8A and FIG. 8B are cross-sectional views showing an essential part of a structure of the connection between the image display apparatus 1 and speaker unit 3, and more specifically, FIG. 8A and FIG. 8B show a structure of the electrical connection and a structure of the mechanical connection, respectively. The structure of the connection between the image display apparatus 1 and speaker unit 4 also has the same structure.

The fixing screw male-threaded section 52*a* is provided inside the speaker unit 3 and fixes the speaker unit 3 to the image display apparatus 1. The fixing thumb nuts 38 and 39 are fixed to the end opposite to the fixing screw thrusting section 52*b* of the fixing screw shaft 52*c* that follows the fixing screw male-threaded section 52*a*.

A female-threaded section 61 is fixed inside the outer facing wall surface 34 of the speaker unit 3 and engaged with the fixing screw male-threaded section 52*a*. Conduction sections 55 and 56 control wiring inside the rail insertion section 51 of the electrodes 53 and 54, wired separately at a positive potential and negative potential. All surrounding sections are insulated and cable connection terminals are formed inside the speaker unit 3.

The rail concave section 50*a* of the image display apparatus 1 is provided with an insulation material 57 and this insulation material 57 has a through hole in the center. The electrode 58 penetrates through the through hole of the insulation material 57 and slightly sticks out of the inner surface of the rail section 50*a* and is pin-shaped. This electrode 58 is the section intended to provide electrical contact between the image display apparatus 1 and speaker unit 3. It is apparent from the figure that this electrode 58 is provided with a stopper as integral part to regulate the amount of protrusion from the surface of the rail section 50*a*. By the edge of this pin-shaped electrode 58 contacting the flat surface of the electrodes 53 and 54, the image display apparatus 1 and speaker unit 3 are electrically connected.

Conduction springs 59 incorporate coil springs so as to always press the electrode 58 by means of spring in the direction of protruding from the inner surface of the rail concave section 50*a* while keeping electrical conduction with the electrode 58. A cable connection terminal is formed on the opposite side of the electrode 58. Holders 60 are fixed to the inner wall of the image display apparatus 1 to regulate the positions of the electrodes 58 and conduction springs 59.

In order to supplement the functional explanations of the above-described configuration, the procedure for mounting the left and right speaker units 3 and 4 onto the image display apparatus 1 will be explained. Suppose the image display apparatus 1 is put on the wall. After confirming that the fixing screw thrusting section 52*b* of the speaker unit 3 or 4 is recessed from the surface of the rail insertion section 51, while holding either one of the speaker units 3 and 4 by hand, the rail insertion section 51 is engaged with the rail section 50*a* from above the image display apparatus 1 and either the speaker unit 3 or 4 is slid downward while holding the rail insertion section 51 in that position. The speaker units 3 and 4 can be moved along the path specified by the rail section 50*a* and an arbitrary mounting position can be selected, which makes it possible to adopt a variety of layouts.

Then, to fix the image display apparatus 1 and the speaker unit 3 or 4 at a position at which the top faces of both match, the fixing thumb nut 38 or 39 is turned clockwise. Since the fixing screw male-threaded section 52*a* inside either the speaker unit 3 or 4 is engaged with the female-threaded section 61, if the fixing thumb nut 38 or 39 is turned clockwise, the fixing screw thrusting section 52*b* sticks out of the rail insertion section 51 and further presses the rail section 50*a* of the image display apparatus 1.

Then, the rail insertion section 51 moves in the direction in which it goes apart from the image display apparatus 1 and stops when it comes in closer contact with the inner wall of the rail convex section 50*a* of the image display apparatus 1. Through the above-described operation, either the speaker unit 3 or 4 is fixed to the image display apparatus 1. On the other hand, regarding electrical connection at this time, when the top face of either the speaker unit 3 or 4 matches the top face of the image display apparatus 1, it is possible to supply power to either the speaker unit 3 or 4 from the image display apparatus 1 by designing and placing the electrodes 58 and the electrodes 53 and 54 so that these electrodes contact with each other. Further, since the electrodes 53 and 54 have a certain length in the vertical direction, even if the relative positions of the image display apparatus 1 and the speaker units 3 or 4 are shifted subtly, the electrical contact is maintained.

By repeating the above-described operation for the rest of the speaker unit 3 or 4, the placement of the speaker units 3 and 4 in the right and left predetermined positions of the image display apparatus 1 is completed.

Further, though not shown, by fixing the speaker units 3 and 4 with a sheet-shaped elastic material inserted between the speaker unit outer facing wall surface 34 and the main unit outer facing wall surface 31, it is possible to prevent chattering when speaker sound is generated.

This embodiment describes the fixing structure of the right and left speaker units 3 and 4 and electrical connection structure. When the audience adds a center speaker to improve the sound characteristic, it is also possible to mount the center speaker using a similar structure with the image display apparatus put on the wall without using any external cables and utilizing the rails on the bottom face or top face of the image display apparatus 1.

As described above, the features of this embodiment are as follows:

1) Placing the rail section 50a on the quasi-entire circumference on the sides that make up the frame of the image display apparatus 1 allows a plurality of speaker units 3 and 4 with a sound generation function to be mounted as integral part of the image display apparatus 1.

2) Providing the electrodes 58 capable of outputting a sound amplification signal close to the rail section 50a of the image display apparatus 1 and providing the electrodes 53 and 54 at the corresponding positions of the speaker units 3 and 4 makes it possible to supply the sound amplification signal from the image display apparatus 1 to the speaker units 3 and 4 without external cables.

3) The rail structure and fixing screw structure allows the speaker units 3 and 4 to be attached or detached to/from the image display apparatus 1 without wrapping around cables on the back of the image display apparatus 1. This structure also makes it possible to select the mounting positions of the speaker units 3 and 4 as appropriate and adopt a variety of layouts.

4) It is possible to add a speaker unit to enhance the acoustic effects to the image display apparatus 1 by connecting the speaker unit as integral part of the image display apparatus 1 using the rail section 50a on the bottom face or top face of the image display apparatus 1. In this case, no external cable is required and the speaker unit can be attached to or detached from the image display apparatus 1 put on the wall.

5) Manufacturing the convexoconcave rail formed on the quasi-entire circumference on the sides that make up the frame of the image display apparatus as integral part of the support structure of the image display section using extrusion processing eliminates the need for additional processing.

As many apparently widely different embodiments of the present invention can be made without departing from the spirit and scope thereof, it is to be understood that the invention is not limited to the specific embodiments thereof except as defined in the claims.

What is claimed is:

1. An image display system comprising:
   an image display apparatus provided with a first electrode and a second electrode;
   a peripheral device provided with a third electrode and a fourth electrode, which can be mounted onto said image display apparatus; and
   a guide for directing a path when a mounting position of said peripheral device on said image display apparatus is changed, wherein
   said first and second electrodes are placed along said guide,
   said first electrode and said third electrode are for supplying power from said image display apparatus to said peripheral device,
   said second electrode and said fourth electrode are for transmitting a signal between said image display apparatus and said peripheral device, and
   said first and second electrodes are placed in such a way as to directly contact said third and fourth electrodes, respectively, by positioning said peripheral device to any of a plurality of mounting positions along said guide.

2. The image display system according to claim 1, wherein said guide is a rail provided on said image display apparatus.

3. The image display system according to claim 1, wherein said guide is an opening or groove provided on said image display apparatus.

4. The image display system according to claim 1, wherein at least part of said guide also serves as said first and second electrodes.

5. The image display system according to claim 1, wherein said image display apparatus is provided with a rectangular image display plane and the length of the diagonal of said image display plane is 20 inches or more.

6. The image display system according to claim 1, wherein said first and second electrodes or said third and fourth electrodes have a spherical shape.

7. The image display system according to claim 6, comprising an elastic material to support said first electrode or said second electrode.

8. An image display apparatus capable of mounting a peripheral device, comprising:
   a guide for directing a path when a mounting position of said peripheral device on said image display apparatus is changed; and
   first and second electrodes that contact third and fourth electrodes provided on said peripheral device, respectively, wherein
   said first and second electrodes are placed along said guide,
   said first electrode and said third electrode are for supplying power from said image display apparatus to said peripheral device,
   said second electrode and said fourth electrode are for transmitting a signal between said image display apparatus and said peripheral device, and
   said first and second electrodes are placed in such a way as to directly contact said third and fourth electrodes, respectively, by positioning said peripheral device to any of a plurality of the mounting positions along said guide.

9. The image display system according to claim 1, wherein said guide is arranged so as to direct said path along of a fringe of said image display apparatus.

10. The image display apparatus according to claim 8, wherein said guide is arranged so as to direct said path along of a fringe of said image display apparatus.

* * * * *

UNITED STATES PATENT AND TRADEMARK OFFICE
CERTIFICATE OF CORRECTION

PATENT NO. : 7,034,902 B2
APPLICATION NO. : 09/941592
DATED : April 25, 2006
INVENTOR(S) : Hisao Tajima It is certified that error appears in the above-identified patent and that said Letters Patent is hereby corrected as shown below:

COLUMN 2:
Line 29, "user's" should read --users'--.

COLUMN 5:
Line 34, "integral" should read --an integral--.

COLUMN 7:
Line 4, "connected" should read --are connected--.
Line 7, "la" should read --1a--.

COLUMN 8:
Line 62, "25" should be deleted.

COLUMN 9:
Line 7, "integral" should read --an integral--.
Line 30, "integral" should read --an integral--.

COLUMN 10:
Line 64, "made" should read --are made--.
Line 66, "gold-plated." should read --is gold-plated.--.

COLUMN 12:
Line 21, "made" should read --are made--.
Line 23, "made" should read --are made--.

COLUMN 13:
Line 14, "integral" should read --an integral--.
Line 24, "integral" should read --an integral--.

COLUMN 14:
Line 24, "integral" should read --an integral--.

UNITED STATES PATENT AND TRADEMARK OFFICE
CERTIFICATE OF CORRECTION

PATENT NO. : 7,034,902 B2
APPLICATION NO. : 09/941592
DATED : April 25, 2006
INVENTOR(S) : Hisao Tajima It is certified that error appears in the above-identified patent and that said Letters Patent is hereby corrected as shown below:

COLUMN 15:
Line 34, "integral" should read --an integral--.
Line 52, "integral" should read --an integral--.
Line 62, "integral" should read --an integral--.

Signed and Sealed this

Thirtieth Day of January, 2007

JON W. DUDAS
*Director of the United States Patent and Trademark Office*